(12) United States Patent
Hung

(10) Patent No.: US 8,807,766 B2
(45) Date of Patent: Aug. 19, 2014

(54) LASER SCANNING PROJECTION APPARATUS WITH PHASE DETECTION AND COMPENSATION

(71) Applicant: Lite-On IT Corporation, Taipei (TW)

(72) Inventor: Chen Chun Hung, Hsinchu (TW)

(73) Assignee: Lite-On Technology Corporation, Taipei (TW)

( * ) Notice: Subject to any disclaimer, the term of this patent is extended or adjusted under 35 U.S.C. 154(b) by 206 days.

(21) Appl. No.: 13/633,248

(22) Filed: Oct. 2, 2012

(65) Prior Publication Data

US 2014/0063472 A1 Mar. 6, 2014

(30) Foreign Application Priority Data

Sep. 4, 2012 (CN) .......................... 2012 1 0323313

(51) Int. Cl.
*G03B 21/28* (2006.01)
*H04N 1/047* (2006.01)

(52) U.S. Cl.
USPC ........ 353/98; 353/122; 359/205.1; 359/223.1

(58) Field of Classification Search
CPC . H04N 9/3129; H04N 9/3141; H04N 9/3164; H04N 9/3185; H04N 9/3194; H04N 1/047; H04N 1/0473; H04N 2210/047; H04N 2201/04703; H04N 2201/04708; H04N 2201/0471; H04N 2201/04713; H04N 2201/04744; H04N 2201/04762

USPC ........ 353/69, 98, 121, 122; 359/201.2, 223.1, 359/224.1, 226.2

See application file for complete search history.

(56) References Cited

U.S. PATENT DOCUMENTS

| | | | |
|---|---|---|---|
| 6,937,372 B2* | 8/2005 | Kandori et al. ............ | 359/198.1 |
| 7,239,436 B2* | 7/2007 | Oettinger et al. .......... | 359/213.1 |
| 7,972,014 B2* | 7/2011 | Hung et al. ................ | 353/69 |
| 8,358,326 B2* | 1/2013 | Hanada ...................... | 347/243 |
| 8,636,367 B1* | 1/2014 | Callison et al. ............. | 353/98 |
| 2008/0158632 A1* | 7/2008 | Yamazaki ................... | 359/202 |

* cited by examiner

*Primary Examiner* — William C Dowling
(74) *Attorney, Agent, or Firm* — McClure, Qualey & Rodack, LLP

(57) ABSTRACT

A laser scanning projection apparatus includes an illumination unit, a projection surface, a scanning mirror, a projection window, an optical sensor, and a controlling unit. The projection window includes a transmissible part and a blocking part. A reflection-differential pattern is formed on the blocking part. When the laser beam reflected by the scanning mirror is projected on the transmissible part, the laser beam is transmitted through the transmissible part and projected on the projection surface. When the laser beam reflected by the scanning mirror is projected on the reflection-differential pattern, a reflective beam with different intensities is reflected by the reflection-differential pattern. The controlling unit calculates a phase difference between an actual projection position and a predetermined projection position of the laser beam according to the sensing signal, and compensating a subsequent image frame according to the phase difference.

17 Claims, 5 Drawing Sheets

LASER SCANNING PROJECTION APPARATUS WITH PHASE DETECTION AND COMPENSATION

This application claims the benefit of People's Republic of China application Serial No. 201210323313.1, filed Sep. 4, 2012, the subject matter of which is incorporated herein by reference.

FIELD OF THE INVENTION

The present invention relates to a laser scanning projection apparatus, and more particularly to a laser scanning projection apparatus with phase detection and compensation.

BACKGROUND OF THE INVENTION

As known, a laser source has a narrow emission spectrum. The use of the laser source in a projection apparatus is able to result in better color purity and create vivid images with extensive color coverage.

FIG. 1 schematically illustrates the architecture of a conventional laser scanning projection apparatus with phase detection and compensation. As shown in FIG. 1, the conventional laser scanning projection apparatus 1 comprises a laser source 11, a scanning mirror 12, a projection window 13, and a projection surface 14.

The laser source 11 emits a laser beam 15 to the scanning mirror 12. The scanning mirror 12 is a two-dimensional microelectromechanical (MEMS) scanning mirror. When the laser beam 15 is reflected by the scanning mirror 12, the laser beam 15 is transmitted through the projection window 13 and projected on specified locations of the projection surface 14 according to a raster scanning trajectory or a Lissajous scanning trajectory. Moreover, the laser beams with various wavelengths are time-sequentially projected on the target locations in order to create a desired image. Take the raster scanning trajectory for example. The laser beam 15 reflected by the scanning mirror 12 is swept across the projection surface 14, wherein one row of a scan line is projected from left to right at a time and the scanning lines are sequentially projected from top to bottom. Moreover, according to the imaging principle of the human visual persistence, an image frame is displayed on the projection surface 14.

As shown in FIG. 1, the projection window 13 comprises a transmissible part 131 and a blocking part 132, wherein the blocking part 132 is disposed around the transmissible part 131. When the laser beam 15 reflected by the scanning mirror 12 is directed to the transmissible part 131, the laser beam 15 is transmitted through the transmissible part 131 and projected on the projection surface 14, thereby scanning and producing a specified image frame on the projection surface 14. When the laser beam 15 reflected by the scanning mirror 12 is directed to the blocking part 132, the laser beam 15 is blocked by the blocking part 132 and thus fails to be projected on the projection surface 14.

For accurately outputting the image, the projection position of the laser beam 15 and corresponding image information should precisely match each other, so that the laser beam 15 with desired color and intensity can be projected on the correct position of the projection surface 14. If there is a phase difference between an actual projection position and a predetermined projection position of the corresponding image information, the image quality is adversely affected.

For compensating the phase difference between the actual projection position and the predetermined projection position, the conventional laser scanning projection apparatus 1 further comprises an optical sensor 16. The optical sensor 16 is used for detecting the status of the projection position of the laser beam 15 that is reflected by the scanning mirror 12. According to the status of the laser beam 15, the optical sensor 16 issues a sensing signal to a controlling unit (not shown). According to the sensing signal, the controlling unit may calculate the phase difference between the actual projection position and the predetermined projection position. In other words, the sensing signal outputted from the optical sensor 16 denotes the position data or the phase data in the space, and the sensing signal does not only denote the intensity of the laser beam. After the phase difference between the actual projection position and the predetermined projection position is obtained, the subsequent image frame is compensated according to the phase difference.

In the conventional laser scanning projection apparatus 1, the optical sensor 16 is located at a specified position. For example, as shown in FIG. 1, the optical sensor 16 is located at an upper edge of the blocking part 132 of the projection window 13. After the laser beam 15 has been switched on within a specified time period to sweep across the blocking part 132 of the projection window 13, a feedback scan line 17 may be swept across the optical sensor 16. If there is no phase difference between the actual projection position and the predetermined projection position, the laser beam 15 will pass the optical sensor 16 in the specified time period.

If there is a phase difference between the actual projection position and the predetermined projection position, the time period of generating the sensing signal by the optical sensor 16 is shifted. According to the time shift, the phase difference between the actual projection position and the predetermined projection position is calculated in order to compensate the subsequent image frame. Since the optical sensor 16 should be located at a specified position by using this method to calculate the phase difference, the applications of the conventional laser scanning projection apparatus 1 are limited. Moreover, a single optical sensor is only able to detect the phase difference along a single direction (e.g. a horizontal direction). For detecting the phase differences along the horizontal direction and the vertical direction, it is necessary to install two optical sensors on the upper edge and the lateral edge of the blocking part 132 of the projection window 13. Consequently, the fabricating cost is increased.

Therefore, there is a need of providing an improved laser scanning projection apparatus with phase detection and compensation in order to eliminate the above drawbacks.

SUMMARY OF THE INVENTION

An embodiment of the present invention provides a laser scanning projection apparatus with phase detection and compensation. The laser scanning projection apparatus includes an illumination unit, a projection surface, a scanning mirror, a projection window, an optical sensor, and a controlling unit. The illumination unit is used for emitting a laser beam. The scanning mirror is used for reflecting the laser beam, so that the laser beam is periodically swept across the projection surface and a plurality of image frames are sequentially generated at a specified image refresh rate. The projection window includes a transmissible part and a blocking part around the transmissible part, wherein a reflection-differential pattern is formed on a surface of the blocking part. When the laser beam reflected by the scanning mirror is projected on the transmissible part, the laser beam is transmitted through the transmissible part and projected on the projection surface. When the laser beam reflected by the scanning mirror is projected on the reflection-differential pattern of the blocking part, a reflective beam with different intensities is reflected by the reflection-differential pattern. The optical sensor is used for receiving the reflective beam, thereby generating a sensing signal indicative of an intensity level of the reflective beam. The controlling unit is for calculating a phase difference between an actual projection position and a predetermined projection position of the laser beam according to the sensing signal, and compensating a subsequent image frame according to the phase difference.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
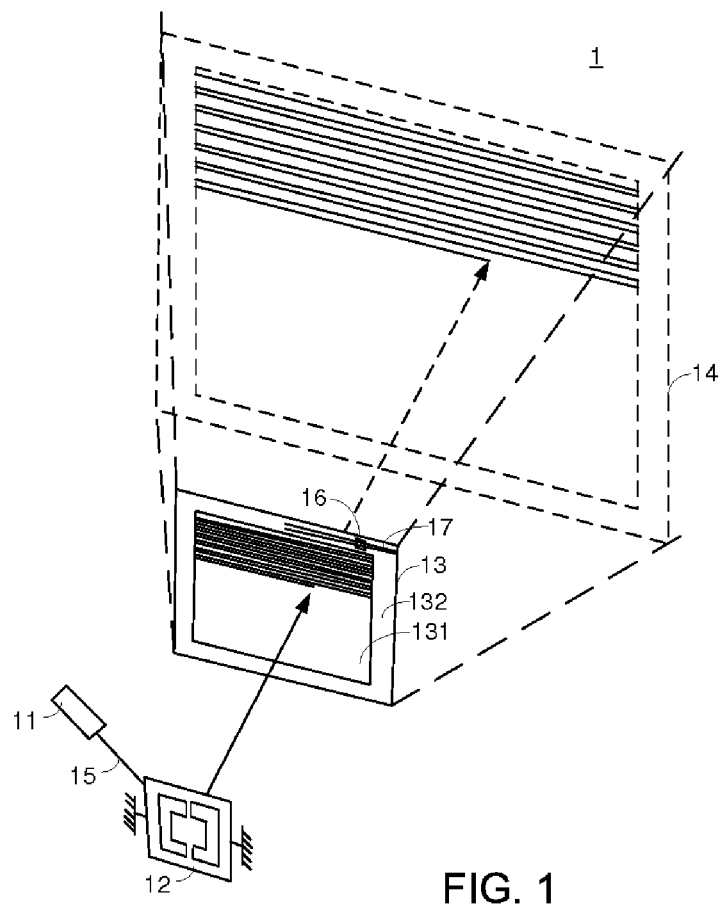
FIG. 1 (prior art) schematically illustrates the architecture of a conventional laser scanning projection apparatus with phase detection and compensation.
Figure 2:
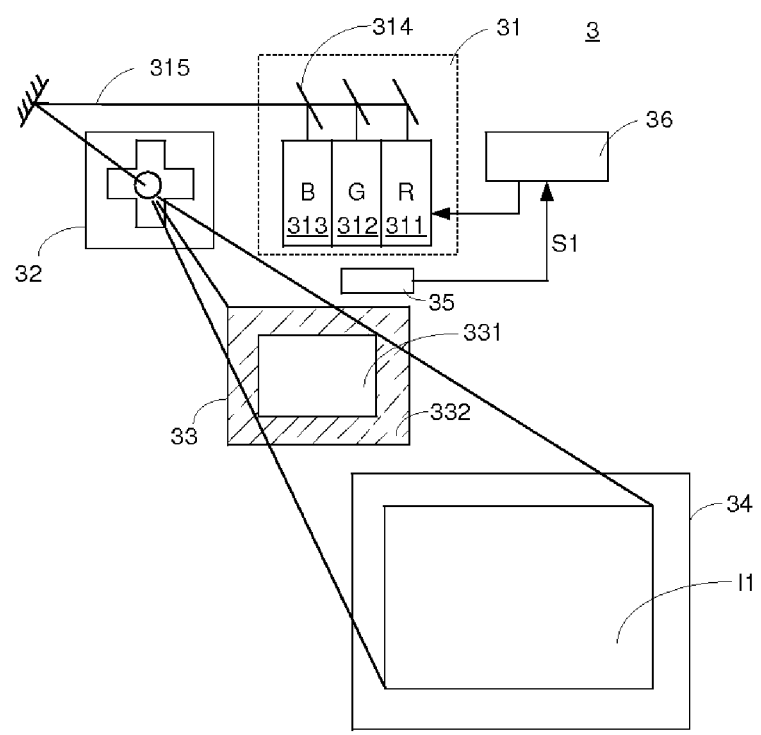
FIG. 2 schematically illustrates the architecture of a laser scanning projection apparatus with phase detection and compensation according to an embodiment of the present invention.

FIG. 2 schematically illustrates the architecture of a laser scanning projection apparatus with phase detection and compensation according to an embodiment of the present invention. As shown in FIG. 2, the laser scanning projection apparatus 3 comprises an illumination unit 31, a scanning mirror 32, a projection window 33, and a projection surface 34.

The illumination unit 31 comprises a red laser source 311, a green laser source 312, a blue laser source 313, and plural dichroic mirrors 314. The red laser source 311, the green laser source 312 and the blue laser source 313 are used for emitting a red beam, a green beam and a blue beam, respectively. By the plural dichroic mirrors 314, the red beam, the green beam and the blue beam from the red laser source 311, the green laser source 312 and the blue laser source 313 are oriented into a single laser beam 315.

In an embodiment, the scanning mirror 32 is a two-dimensional microelectromechanical (MEMS) scanning mirror. When the laser beam 315 is reflected by the scanning mirror 32, the laser beam 315 is transmitted through the projection window 33 and projected on specified locations of the projection surface 34 according to a raster scanning trajectory or a Lissajous scanning trajectory. Moreover, the laser beams with various wavelengths are time-sequentially projected on the target locations in order to create a desired image. Take the raster scanning trajectory for example. The laser beam 315 reflected by the scanning mirror 32 is swept across the projection surface 34, wherein one row of a scan line is projected from left to right at a time and the scanning lines are sequentially projected from top to bottom. In such way, a plurality of image frames are projected on the projection surface 34 at a specified image refresh rate.

As shown in FIG. 2, the projection window 33 comprises a transmissible part 331 and a blocking part 332, wherein the blocking part 332 is disposed around the transmissible part 331. When the laser beam 315 reflected by the scanning mirror 32 is projected on the transmissible part 331, the laser beam 315 is transmitted through the transmissible part 331 and projected on the projection surface 34, thereby scanning and producing a specified image frame I1 on the projection surface 34. When the laser beam 315 reflected by the scanning mirror 32 is projected on the blocking part 332, the laser beam 315 is blocked by the blocking part 332 and thus fails to be projected on the projection surface 34.

Generally, the laser beam 315 reflected by the scanning mirror 32 is swept across the whole projection window 33 (including the blocking part 332). However, only the portion of the laser beam 315 that is swept across the transmissible part 331 can be transmitted through the projection window 33 and projected on the projection surface 34, thereby scanning and producing the specified image frame on the projection surface 34.

For accurately outputting the image, the projection position of the laser beam 315 and corresponding image information should precisely match each other, so that the laser beam 315 with desired color and intensity can be projected on the projection surface 34. If there is a phase difference between an actual projection position and a predetermined projection position of the corresponding image information, the image quality is adversely affected.

For compensating the phase difference between the actual projection position and the predetermined projection position, the laser scanning projection apparatus 3 further comprises an optical sensor 35 and a controlling unit 36. The optical sensor 35 is used for detecting the intensity of the laser beam 315 that is reflected by the blocking part 332 of the projection window 33, thereby issuing a sensing signal S1 to the controlling unit 36. According to the sensing signal S1, the controlling unit 36 may calculate the phase difference between the actual projection position and the predetermined projection position of the laser beam 315. After the phase difference between the actual projection position and the predetermined projection position is obtained, the subsequent image frame is compensated according to the phase difference.

In an embodiment, the surface of the blocking part 332 of the projection window 33 is specially treated, so that the surface of the blocking part 332 for receiving the laser beam 315 has a pattern with different reflecting capabilities. For clarification and brevity, the pattern with different reflecting capabilities is also referred as a reflection-differential pattern. When the laser beam 315 reflected by the scanning mirror 32 is projected on the reflection-differential pattern of the blocking part 332, a reflective beam with different intensities is reflected by the reflection-differential pattern. In other words, the optical sensor 35 may be located at an arbitrary position where the reflective beam is detectable, so that the change of the intensity of the reflective beam can be realized. According to the change of the intensity of the reflective beam, the phase difference between the actual projection position and the predetermined projection position of the laser beam 315 may be calculated.

Figure 3A:
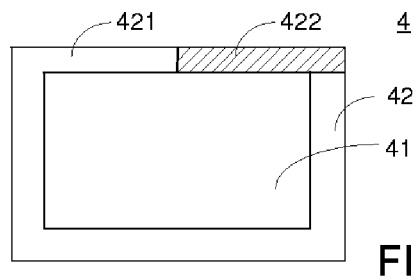
FIG. 3A schematically illustrates an exemplary projection window for use in the laser scanning projection apparatus of the present invention.

FIG. 3A schematically illustrates an exemplary projection window for use in the laser scanning projection apparatus of the present invention. As shown in FIG. 3A, the projection window 4 comprises a transmissible part 41 and a blocking part 42, wherein the blocking part 42 is disposed around the transmissible part 41. When the laser beam reflected by the scanning mirror is projected on the transmissible part 41, the laser beam is transmitted through the transmissible part 41 and projected on the projection surface, thereby scanning and producing a specified image frame on the projection surface. When the laser beam reflected by the scanning mirror is projected on the blocking part 42, the laser beam is blocked by the blocking part 42 and thus fails to be projected on the projection surface.

In this embodiment, a reflection-differential pattern is formed on an upper edge of the blocking part 42. As shown in FIG. 3A, the reflection-differential pattern of the blocking part 42 comprises a light-scattering band 421 and a light-absorbing band 422. The light-scattering band 421 is made of a light-scattering material, and the light-absorbing band 422 is made of a light-absorbing material. In a case that the laser beam is projected on the light-scattering band 421, a reflective beam is reflected to the space by the light-scattering band 421. Consequently, the reflective beam detected by the optical sensor has a high intensity level. Whereas, in a case that the laser beam is projected on the light-absorbing band 422, the laser beam is completely or partially absorbed by the light-absorbing band 422. Consequently, the reflective beam detected by the optical sensor has a low intensity level.

In other words, the intensity of the reflective beam from the light-scattering band 421 is higher than the intensity of the reflective beam from the light-absorbing band 422. According to the intensity of the reflective beam detected by the optical sensor, the controlling unit can judge whether the reflective beam is reflected by the light-scattering band 421 or the light-absorbing band 422.

Figure 3B:
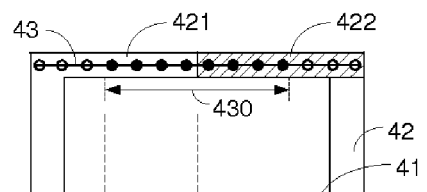
FIG. 3B schematically illustrates a calibrating scan line projected on the blocking part of the exemplary projection window as shown in FIG. 3A.

In an embodiment, by using the different reflecting capabilities of the light-scattering band 421 and the light-absorbing band 422 and the predetermined parameters of the laser beams, the functions of phase detection and compensation can be achieved. FIG. 3B schematically illustrates a calibrating scan line projected on the blocking part of the exemplary projection window as shown in FIG. 3A. In FIG. 3B, the dots indicate the projection points of the laser beam projected on the reflection-differential pattern of the blocking part 42. As shown in FIG. 3B, the solid dots denote the projection points of the laser beam which are turned on, and the hollow dots denotes the projection points of the laser beam which are turned off.

In this embodiment, a calibrating scan line 43 is projected on the reflection-differential pattern from left to right along a specified direction (e.g. a horizontal direction). Moreover, the calibrating scan line 43 comprises a calibrating segment 430. The calibrating segment 430 is composed of a plurality of consecutive turning-on projection points, which are denoted by solid dots. Preferably, the calibrating segment 430 is spanned across the light-scattering band 421 and the light-absorbing band 422. Moreover preferably, the calibrating segment 430 along the specified direction is longer than the light-absorbing band 422 along the specified direction.

Figure 3C:
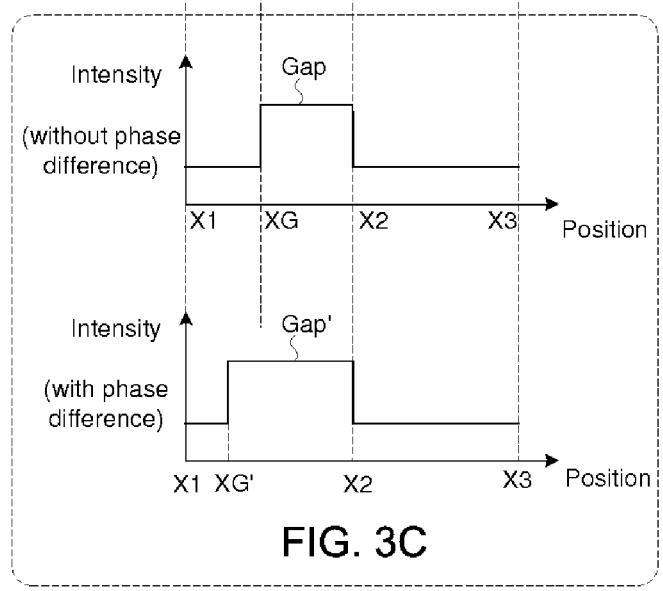
FIG. 3C schematically illustrates the change of the intensity of the reflective beam corresponding to the calibrating scan line as shown in FIG. 3B.

FIG. 3C schematically illustrates the change of the intensity of the reflective beam corresponding to the calibrating scan line as shown in FIG. 3B. As shown in FIGS. 3B and 3C, the light-scattering band 421 is in the range between the coordinate X1 and the coordinate X2, and the light-absorbing band 422 is in the range between the coordinate X2 and the coordinate X3. In a case that there is no phase difference between the actual projection position and the predetermined projection position of the laser beam projected on the calibrating scan line 43, the reflective beam corresponding to the calibrating segment 430 and the light-scattering band 421 has a high intensity level. Otherwise, the reflective beam detected by the optical sensor has the low intensity level.

For example, as shown in FIG. 3C, since the projection points corresponding to the light-scattering band 421 in the range between the coordinate X1 and the coordinate XG are turned off, the reflective beam detected by the optical sensor has the low intensity level. Since the projection points corresponding to the light-scattering band 421 in the range between the coordinate XG and the coordinate X2 are turned on, the reflective beam detected by the optical sensor has the high intensity level, wherein the length of the high intensity level is equal to Gap. Since the light-absorbing band 422 is in the range between the coordinate X2 and the coordinate X3, regardless of whether the projection points are turned on or turned off, the reflective beam detected by the optical sensor has the low intensity level.

In a case that there is a phase difference between the actual projection position and the predetermined projection position of the laser beam projected on the calibrating scan line 43, the predetermined projection point at the coordinate XG is shifted to the actual projection position at the coordinate XG'. Meanwhile, since the projection points corresponding to the light-scattering band 421 in the range between the coordinate X1 and the coordinate XG' are turned off, the reflective beam detected by the optical sensor has the low intensity level. Since the projection points corresponding to the light-scattering band 421 in the range between the coordinate XG' and the coordinate X2 are turned on, the reflective beam detected by the optical sensor has the high intensity level, wherein the length of the high intensity level is equal to Gap'. Since the light-absorbing band 422 is in the range between the coordinate X2 and the coordinate X3, regardless of whether the projection points are turned on or turned off, the reflective beam detected by the optical sensor has the low intensity level.

Please refer to FIG. 3C again. In a case that there is no phase difference between the actual projection position and the predetermined projection position of the laser beam projected on the calibrating scan line 43, the length of the high intensity level Gap=X2−XG. In a case that there is a phase difference between the actual projection position and the predetermined projection position of the laser beam projected on the calibrating scan line 43, the length of the high intensity level Gap'=X2−XG'. Consequently, Gap−Gap'=XG'−XG. That is, according to the difference between Gap and Gap', the phase difference can be quickly obtained.

Figure 4A:
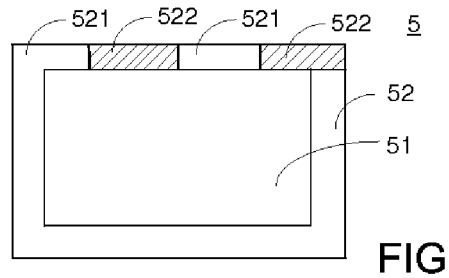
FIG. 4A schematically illustrates another exemplary projection window for use in the laser scanning projection apparatus of the present invention.

FIG. 4A schematically illustrates another exemplary projection window for use in the laser scanning projection apparatus of the present invention. As shown in FIG. 4A, the projection window 5 comprises a transmissible part 51 and a blocking part 52, wherein the blocking part 52 is disposed around the transmissible part 51. When the laser beam reflected by the scanning mirror is projected on the transmissible part 51, the laser beam is transmitted through the transmissible part 51 and projected on the projection surface, thereby scanning and producing a specified image frame on the projection surface. When the laser beam reflected by the scanning mirror is projected on the blocking part 52, the laser beam is blocked by the blocking part 52 and thus fails to be projected on the projection surface.

In this embodiment, a reflection-differential pattern is formed on an upper edge of the blocking part 52. As shown in FIG. 4A, the reflection-differential pattern of the blocking part 52 comprises two light-scattering bands 521 and two light-absorbing bands 522. The light-scattering band 521 is made of a light-scattering material, and the light-absorbing band 522 is made of a light-absorbing material. In a case that the laser beam is projected on the light-scattering band 521, a reflective beam is reflected to the space by the light-scattering band 521. Consequently, the reflective beam detected by the optical sensor has a high intensity level. Whereas, in a case that the laser beam is projected on the light-absorbing band 522, the laser beam is completely or partially absorbed by the light-absorbing band 522. Consequently, the reflective beam detected by the optical sensor has a low intensity level.

Figure 4B:
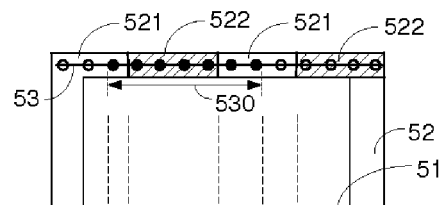
FIG. 4B schematically illustrates a calibrating scan line projected on the blocking part of the exemplary projection window as shown in FIG. 4A.

FIG. 4B schematically illustrates a calibrating scan line projected on the blocking part of the exemplary projection window as shown in FIG. 4A. In FIG. 4B, the dots indicate the projection points of the laser beam projected on the reflection-differential pattern of the blocking part 52. As shown in FIG. 4B, the solid dots denote the projection points of the laser beam which are turned on, and the hollow dots denotes the projection points of the laser beam which are turned off.

In this embodiment, a calibrating scan line 53 is projected on the reflection-differential pattern from left to right along a specified direction (e.g. a horizontal direction). Moreover, the calibrating scan line 53 comprises a calibrating segment 530. The calibrating segment 530 is composed of a plurality of consecutive turning-on projection points, which are denoted by solid dots. Preferably, the calibrating segment 530 is spanned across the light-scattering band 521 and the light-absorbing band 522. Moreover preferably, the calibrating segment 530 along the specified direction is longer than the light-absorbing band 522 along the specified direction.

Figure 4C:
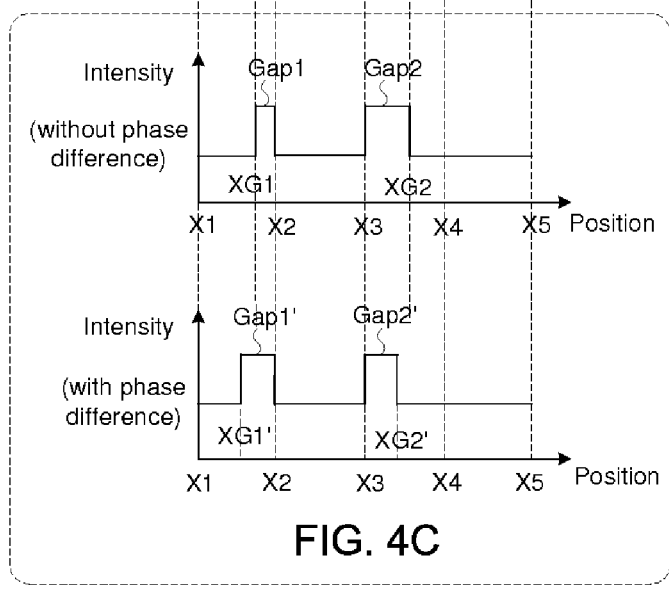
FIG. 4C schematically illustrates the change of the intensity of the reflective beam corresponding to the calibrating scan line as shown in FIG. 4B.

FIG. 4C schematically illustrates the change of the intensity of the reflective beam corresponding to the calibrating scan line as shown in FIG. 4B. As shown in FIGS. 4B and 4C, the light-scattering bands 521 are in the range between the coordinate X1 and the coordinate X2 and in the range between the coordinate X3 and the coordinate X4, and the light-absorbing bands 422 are in the range between the coordinate X2 and the coordinate X3 and in the range between the coordinate X4 and the coordinate X5. In a case that there is no phase difference between the actual projection position and the predetermined projection position of the laser beam projected on the calibrating scan line 53, the reflective beam corresponding to the calibrating segment 530 and the light-scattering band 521 has a high intensity level. Otherwise, the reflective beam detected by the optical sensor has the low intensity level.

For example, as shown in FIG. 4C, since the projection points corresponding to the light-scattering band 521 in the range between the coordinate X1 and the coordinate XG1 are turned off, the reflective beam detected by the optical sensor has the low intensity level. Since the projection points corresponding to the light-scattering band 521 in the range between the coordinate XG1 and the coordinate X2 are turned on, the reflective beam detected by the optical sensor has the high intensity level, wherein the length of the high intensity level is equal to Gap1. Since the light-absorbing band 522 is in the range between the coordinate X2 and the coordinate X3, regardless of whether the projection points are turned on or turned off, the reflective beam detected by the optical sensor has the low intensity level. Since the projection points corresponding to the light-scattering band 521 in the range between the coordinate X3 and the coordinate XG2 are turned on, the reflective beam detected by the optical sensor has the high intensity level, wherein the length of the high intensity level is equal to Gap2. Since the projection points corresponding to the light-scattering band 521 in the range between the coordinate XG2 and the coordinate X4 are turned off, the reflective beam detected by the optical sensor has the low intensity level. Since the light-absorbing band 522 is in the range between the coordinate X4 and the coordinate X5, regardless of whether the projection points are turned on or turned off, the reflective beam detected by the optical sensor has the low intensity level.

In a case that there is a phase difference between the actual projection position and the predetermined projection position of the laser beam projected on the calibrating scan line 53, the predetermined projection point at the coordinate XG1 is shifted to the actual projection position at the coordinate XG1', and the predetermined projection point at the coordinate XG2 is shifted to the actual projection position at the coordinate XG2'. Meanwhile, since the projection points corresponding to the light-scattering band 521 in the range between the coordinate X1 and the coordinate XG1' are turned off, the reflective beam detected by the optical sensor has the low intensity level. Since the projection points corresponding to the light-scattering band 521 in the range between the coordinate XG1' and the coordinate X2 are turned on, the reflective beam detected by the optical sensor has the high intensity level, wherein the length of the high intensity level is equal to Gap1'. Since the light-absorbing band 522 is in the range between the coordinate X2 and the coordinate X3, regardless of whether the projection points are turned on or turned off, the reflective beam detected by the optical sensor has the low intensity level. Since the projection points corresponding to the light-scattering band 521 in the range between the coordinate X3 and the coordinate XG2' are turned on, the reflective beam detected by the optical sensor has the high intensity level, wherein the length of the high intensity level is equal to Gap2'. Since the projection points corresponding to the light-scattering band 521 in the range between the coordinate XG2' and the coordinate X4 are turned off, the reflective beam detected by the optical sensor has the low intensity level. Since the light-absorbing band 522 is in the range between the coordinate X4 and the coordinate X5, regardless of whether the projection points are turned on or turned off, the reflective beam detected by the optical sensor has the low intensity level.

Please refer to FIG. 4C again. In a case that there is no phase difference between the actual projection position and the predetermined projection position of the laser beam projected on the calibrating scan line 53, Gap1=X2−XG1, and Gap2=XG2−X3. In a case that there is a phase difference between the actual projection position and the predetermined projection position of the laser beam projected on the calibrating scan line 53, Gap1'=X2−XG1', and Gap2'=XG2'−X3. Consequently, Gap1−Gap1'=XG1'−XG1, and Gap2−Gap2'=XG2−XG2'. That is, according to the difference between Gap1 and Gap1' and/or the difference between Gap2 and Gap2', the phase difference can be quickly obtained.

From the above discussion, by using the different reflecting capabilities of the light-scattering band and the light-absorbing band and using the calibrating segment with a plurality of consecutive turning-on projection points, the functions of phase detection and compensation along a specified direction (e.g. a horizontal direction) can be achieved. In the above embodiments as shown in FIGS. 3A and 4A, the light-scattering band and the light-absorbing band of the projection window are formed on the upper edge of the blocking part in order to achieve the functions of phase detection and compensation along the horizontal direction.

Figure 5:
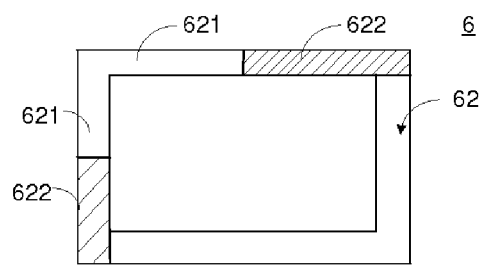
FIG. 5 schematically illustrates another exemplary projection window for use in the laser scanning projection apparatus of the present invention.
Figure 6:
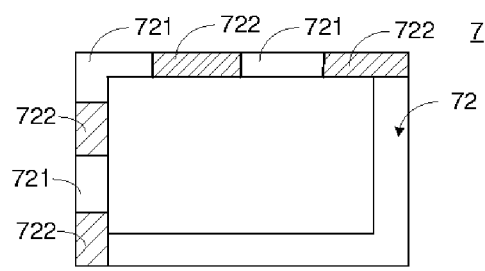
FIG. 6 schematically illustrates another exemplary projection window for use in the laser scanning projection apparatus of the present invention.

It is noted that numerous modifications and alterations of the projection window may be made while retaining the teachings of the invention. As shown in FIG. 5, the light-scattering band 621 and the light-absorbing band 622 of the projection window 6 are formed on an upper edge and a lateral edge of the blocking part 62 in order to achieve the functions of phase detection and compensation along the horizontal direction and the vertical direction. Similarly, as shown in FIG. 6, the light-scattering band 721 and the light-absorbing band 722 of the projection window 7 are formed on an upper edge and a lateral edge of the blocking part 72 in order to achieve the functions of phase detection and compensation along the horizontal direction and the vertical direction. Under this circumstance, only one optical sensor located at an arbitrary position may achieve the functions of phase detection and compensation along the horizontal direction and the vertical direction.

In an embodiment, the projection window of the laser scanning projection apparatus of the present invention is implemented by a protective glass plate (not shown). Preferably, the protective glass plate is attached on an inner wall of a light-outputting port of the laser scanning projection apparatus. Under this circumstance, the transmissible part is aligned with the light-outputting port and the size of the transmissible part is substantially equal to the size of the light-outputting port. Moreover, the reflection-differential pattern of the blocking part is formed on an edge (e.g. an upper edge) of the protective glass plate. Furthermore, in some embodiments, the reflection-differential pattern of the blocking part is directly formed on an inner wall surrounding the light-outputting port (not shown) of the laser scanning projection apparatus by an etching process, a coating process, a polishing process or any other suitable machining process. In some other embodiments, the projection window may be disposed in the space between the scanning mirror and the light-outputting port as long as the laser beam is transmissible through the transmissible part but blocked by the blocking part.

As previously described in the conventional laser scanning projection apparatus with phase detection and compensation, the optical sensor should be located at a specified position, so that the applications of the conventional laser scanning projection apparatus are limited. Moreover, a single optical sensor is only able to detect the phase difference along a single direction. For detecting the phase differences along the horizontal direction and the vertical direction, it is necessary to install two optical sensors on the upper edge and the lateral edge of the blocking part of the projection window, so that the conventional laser scanning projection apparatus is not cost-effective.

From the above descriptions, the present invention provides a laser scanning projection apparatus with phase detection and compensation. The surface of the blocking part of the projection window is specially treated, so that the surface of the blocking part for receiving the laser beam has a reflection-differential pattern. When the laser beam reflected by the scanning mirror is projected on the reflection-differential pattern of the blocking part, a reflective beam with different intensities is reflected by the reflection-differential pattern. Consequently, the optical sensor may be located at an arbitrary position along the optical path of the reflective beam in order to detect the change of the intensity of the reflective beam. According to the change of the intensity of the reflective beam, the phase difference between the actual projection position and the predetermined projection position of the laser beam may be calculated. That is, the phase difference may be easily obtained by using the optical sensor to detect the change of the intensity of the reflective beam. Moreover, since a single optical sensor is able to detect the phase differences along the horizontal direction and the vertical direction, the laser scanning projection apparatus of the present invention is cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A laser scanning projection apparatus with phase detection and compensation, the laser scanning projection apparatus comprising:
    an illumination unit for emitting a laser beam;
    a projection surface;
    a scanning mirror for reflecting the laser beam, so that the laser beam is periodically swept across the projection surface and a plurality of image frames are sequentially generated at a specified image refresh rate;
    a projection window comprising a transmissible part and a blocking part around the transmissible part, wherein a reflection-differential pattern is formed on a surface of the blocking part, wherein when the laser beam reflected by the scanning mirror is projected on the transmissible part, the laser beam is transmitted through the transmissible part and projected on the projection surface, wherein when the laser beam reflected by the scanning mirror is projected on the reflection-differential pattern of the blocking part, a reflective beam with different intensities is reflected by the reflection-differential pattern;
    an optical sensor for receiving the reflective beam, thereby generating a sensing signal indicative of an intensity level of the reflective beam; and
    a controlling unit for calculating a phase difference between an actual projection position and a predetermined projection position of the laser beam according to the sensing signal, and compensating a subsequent image frame according to the phase difference.

2. The laser scanning projection apparatus as claimed in claim 1, wherein the optical sensor is located at an arbitrary position where the reflective beam is detectable by the optical sensor.

3. The laser scanning projection apparatus as claimed in claim 1, wherein the reflection-differential pattern of the blocking part comprises a light-scattering band and a light-absorbing band.

4. The laser scanning projection apparatus as claimed in claim 3, wherein the laser beam is controlled to scan across a boundary between the light-scattering band and the light-absorbing band with a plurality of consecutive turning-on projection points.

5. The laser scanning projection apparatus as claimed in claim 4, wherein the reflective beam reflected by the light-scattering band has a high intensity level, and the reflective beam reflected by the light-absorbing band has a low intensity level.

6. The laser scanning projection apparatus as claimed in claim 5, wherein a length of the high intensity level is detected and calculated, and the phase difference is calculated according to a difference between the detected length and a correct length of the high intensity level with no phase difference.

7. The laser scanning projection apparatus as claimed in claim 3, wherein the laser beam is reflected by the scanning mirror to project a calibrating scan line on the reflection-differential pattern along a specified direction, wherein the calibrating scan line comprises a calibrating segment, which is composed of a plurality of consecutive turning-on projection points.

8. The laser scanning projection apparatus as claimed in claim 7, wherein the reflective beam reflected by the light-scattering band has a high intensity level, and the reflective beam reflected by the light-absorbing band has a low intensity level.

9. The laser scanning projection apparatus as claimed in claim 8, wherein a length of the high intensity level is detected and calculated, and the phase difference is calculated according to a difference between the detected length and a correct length of the high intensity level with no phase difference.

10. The laser scanning projection apparatus as claimed in claim 7, wherein the calibrating segment is spanned across the light-scattering band and the light-absorbing band.

11. The laser scanning projection apparatus as claimed in claim 7, wherein the calibrating segment along the specified direction is longer than the light-absorbing band along the specified direction.

12. The laser scanning projection apparatus as claimed in claim 1, wherein the projection window is implemented by a protective glass plate, wherein the protective glass plate is attached on an inner wall of a light-outputting port of the laser scanning projection apparatus.

13. The laser scanning projection apparatus as claimed in claim 12, wherein the reflection-differential pattern is formed on an edge of the protective glass plate.

14. The laser scanning projection apparatus as claimed in claim 1, wherein the reflection-differential pattern is formed by an etching process, a coating process or a polishing process.

15. The laser scanning projection apparatus as claimed in claim 1, wherein the reflection-differential pattern is formed on an upper edge of the blocking part of the projection window.

16. The laser scanning projection apparatus as claimed in claim 1, wherein the reflection-differential pattern is formed on a lateral edge of the blocking part of the projection window.

17. The laser scanning projection apparatus as claimed in claim 1, wherein the reflection-differential pattern of the blocking part is directly formed on an inner wall surrounding a light-outputting port of the laser scanning projection apparatus.

* * * * *